United States Patent
Ragan

(10) Patent No.: US 9,630,784 B2
(45) Date of Patent: Apr. 25, 2017

(54) TRANSFER-ROLLER DESTACKER

(71) Applicant: Laitram, L.L.C., Harahan, LA (US)

(72) Inventor: Bryant G. Ragan, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 0 days.

(21) Appl. No.: 14/713,916

(22) Filed: May 15, 2015

(65) Prior Publication Data

US 2016/0332824 A1    Nov. 17, 2016

(51) Int. Cl.
*B65G 47/26* (2006.01)
*B65G 47/32* (2006.01)
*B65G 47/14* (2006.01)

(52) U.S. Cl.
CPC ......... *B65G 47/32* (2013.01); *B65G 47/1492* (2013.01)

(58) Field of Classification Search
CPC ..... B65G 47/32; B65G 47/1492; B65G 13/06
USPC ........ 198/456; 193/35 R, 35 A, 35 SS, 35 C, 193/35 TE, 35 F, 35 MD, 35 J, 35 G, 193/35 B, 35 S, 36, 37
See application file for complete search history.

(56) References Cited

U.S. PATENT DOCUMENTS

| | | | |
|---|---|---|---|
| 2,680,509 A * | 6/1954 | Lawson | B65G 37/00 198/606 |
| 3,160,402 A * | 12/1964 | Meyer | B01J 2/26 198/570 |
| 3,583,621 A * | 6/1971 | Bryant | B65G 47/53 226/189 |
| 3,831,733 A | 8/1974 | Howard et al. | |
| 4,271,755 A * | 6/1981 | Kintgen | B65G 57/245 100/137 |
| 4,966,072 A | 10/1990 | Ellis-Brown | |
| 6,609,607 B2 | 8/2003 | Woltjer et al. | |
| 7,506,750 B2 | 3/2009 | Costanzo et al. | |
| 2015/0129393 A1 | 5/2015 | Ragan | |

FOREIGN PATENT DOCUMENTS

| | | |
|---|---|---|
| JP | 3155408 A | 7/1991 |
| JP | 78831 U | 2/1995 |
| JP | 07277491 A | 10/1995 |
| WO | 2013169343 A1 | 11/2013 |

OTHER PUBLICATIONS

Interroll Conveyor Lines, catalog excerpt, Feb. 2011, Interroll Holding AG, Sant'Antonito, CH.
International Search Report and Written Opinion of the International Searching Authority, PCT/US2016/029150, mailed Aug. 9, 2016, Korean Intellectual Property Office, Daejeon, Republic of Korea.

* cited by examiner

*Primary Examiner* — William R Harp
(74) *Attorney, Agent, or Firm* — James T. Cronvich

(57) ABSTRACT

A destacking conveyor and a roller transfer device. The destacking conveyor includes an infeed conveyor feeding articles to a roller transfer device at a first elevation. A discharge conveyor at a lower elevation receives articles dropped from the roller transfer device. The roller transfer device comprises an array of closely spaced rollers whose axial lengths decrease with distance from the infeed conveyor to form an oblique drop-off edge over which articles drop and unstack.

9 Claims, 1 Drawing Sheet

TRANSFER-ROLLER DESTACKER

BACKGROUND

The invention relates generally to power-driven conveyors and more particularly to roller transfers between conveyors.

In the parcel-handling industry masses of parcels and envelopes are conveyed to processing stations that perform specific functions, such as applying or reading labels. Many such processing stations can handle only one parcel at a time. Singulators convert a mass flow of parcels into a single file. But often parcels in a mass flow are stacked atop one another. And singulators, which singulate the flow, are not normally designed to unstack stacked parcels.

SUMMARY

One version of a destacking conveyor embodying features of the invention comprises a first conveyor conveying a mass flow of articles off an exit end at a first elevation. A roller transfer system at the exit end of the first conveyor at the first elevation receives articles from the first conveyor. The roller transfer system extends in a length direction from an upstream end proximate the exit end of the first conveyor to an opposite downstream end. The roller transfer system includes a plurality of closely spaced rollers rotatable on axes arranged to transfer articles away from the exit end of the first conveyor. A second conveyor at a second elevation lower than the first elevation below the roller transfer system receives articles dropping off the roller transfer system. The axial lengths of the rollers decrease monotonically from the upstream end to the downstream end of the roller transfer system.

DETAILED DESCRIPTION

Figure 1:
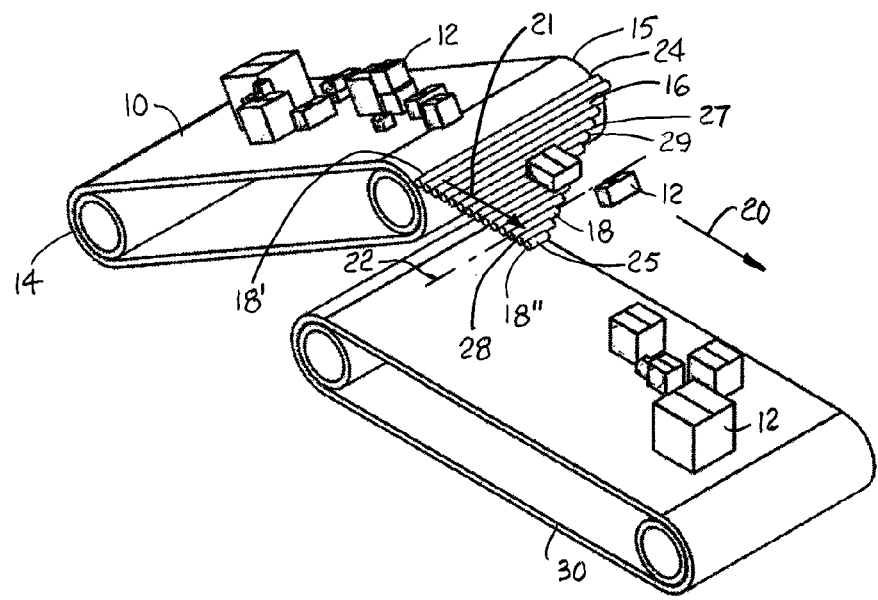
FIG. 1 is an isometric view of a destacking conveyor system embodying features of the invention.
Figure 2:
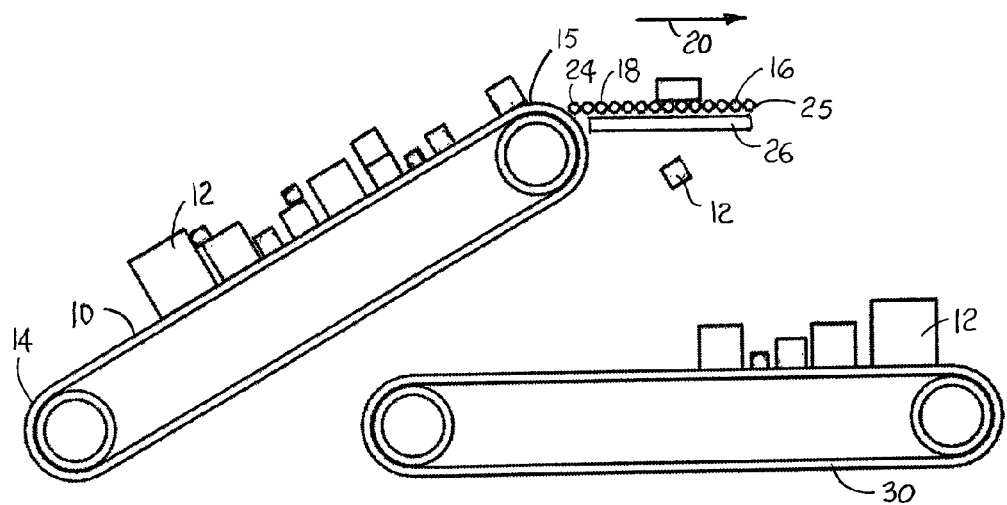
FIG. 2 is a side elevation view of the destacking conveyor system of FIG. 1.

FIGS. 1 and 2 depict a destacking conveyor system embodying features of the invention. A first conveyor 10, shown as an incline belt conveyor, conveys a mass of articles 12, such as parcels and envelopes, from a lower entrance end 14 to an upper exit end 15. The elevation at the exit end 15 is greater than at the entrance end 14. But the conveyor 10 could be a horizontal conveyor with the entrance end 14 at the same elevation as the exit end 15.

The first conveyor 10 feeds the articles 12 onto a roller transfer device 16, which is constructed of an array of side-by-side rollers 18 closely spaced apart in a conveying direction 20. The rollers 18 rotate on parallel axes 22 that are perpendicular to the conveying direction 20 and to a length direction 21 of the roller transfer device 16. Alternatively, the rollers could be arranged with their axes oblique to the length direction 21. As shown, all the rollers 18 are at the same elevation as the exit end 15 of the first conveyor 10. For a better grip on the articles 12, the rollers 18 could have a high-friction periphery made of rubber or an elastomer, for example. The rollers 18 may all be passive rollers, in which articles 12 advance across the rollers by their own momentum or by back pressure from trailing articles. If all the rollers are passive, the array could be tilted slightly downward from an upstream end 24 to a downstream end 25 in the length direction 21 of the roller transfer device 16 to receive the aid of gravity in conveying articles 12 along the roller transfer device. One or more of the rollers 18 could be motorized rollers. If one or more are motorized and others are idle, each idle roller could be connected to one or another of the motorized rollers by transmission belts or gears. In that way all the rollers would be activated together. As another alternative, the rollers 18 could be made of or include an electrically conductive material. A linear-motor stator 26 close to the array of rollers 18 generates a magnetic flux wave that induces eddy currents in the electrically conductive rollers 18. The reaction field caused by the eddy currents interacts with the stator's magnetic flux wave to generate a torque that rotates the rollers 18. Thus, the electrically conductive roller 18 acts as a rotor and forms a linear-induction motor with the stator 26. If the rollers include soft-iron elements or permanent magnets, they would act as rotors and form reluctance motors or synchronous motors with the stator 26.

As better shown in FIG. 1, the axial lengths of the rollers 18 in the roller transfer device 16 decrease monotonically from the longest roller 18' at the upstream end 24 to the shortest roller 18" at the downstream end 25 roughly resembling a harp or a xylophone in shape. In this example, the first axial ends 28 of all the rollers 18 are aligned in a line perpendicular to the roller axes 22 and parallel to the length direction 21, and the opposite second axial ends 29 are aligned along a line oblique to the roller axes and to the length direction forming, in plan view, a right triangle whose hypotenuse lies on the oblique line. Thus, the length of the roller transfer device 16 in the length direction 21 varies across its width in the axial direction of the rollers 18. And the axial ends of the rollers not aligned in a line parallel to the length direction 21 form an edge 27 of the roller transfer device across which articles conveyed in the conveying direction are passed. The rollers could alternatively be arranged to form other triangular shapes, such as an isosceles triangular shape with two oblique edges converging from the upstream end to the downstream end.

A discharge conveyor 30 is disposed at a lower elevation than the exit end 15 of the first conveyor and the downstream end 25 of the roller transfer device 16. The discharge conveyor 30 receives articles 12 that drop from the roller transfer device 16 over the edge 27. The oblique edge 27 of the rollers 18 at their second axial ends 29 provides a longer drop-off edge than would be provided if all the rollers were the same length. For this reason and because the edge is oblique to the length direction 21, stacked articles are more likely to become unstacked in their drop to the discharge conveyor 30.

What is claimed is:
1. A destacking conveyor comprising:
   a first conveyor having an exit end, the first conveyor conveying a mass flow of articles off the exit end at a first elevation;
   a roller transfer system having an upstream end disposed at the first elevation proximate the exit end of the first conveyor to convey articles received from the first conveyor at the first elevation, wherein the roller transfer system extends in a length direction from the upstream end to an opposite downstream end and includes a plurality of closely spaced rollers rotatable on axes arranged to transfer articles atop the rollers at the first elevation away from the exit end of the first conveyor;

a second conveyor disposed at a second elevation lower than the first elevation and below the roller transfer system to receive articles dropping off the roller transfer system;

wherein the axial lengths of the rollers decrease monotonically from the upstream end to the downstream end of the roller transfer system.

2. A destacking conveyor as in claim 1 wherein the plurality of closely spaced rollers are arranged to rotate on axes perpendicular to the length direction.

3. A destacking conveyor as in claim 2 wherein the rollers have first and second axial ends and wherein the first axial ends of the rollers are aligned along a line perpendicular to the axes.

4. A destacking conveyor as in claim 2 wherein the rollers have first and second axial ends and wherein the second axial ends of the rollers are aligned along a line oblique to the axes and form a drop-off edge over which conveyed articles drop to the second conveyor.

5. A destacking conveyor as in claim 1 wherein the rollers have first and second axial ends and wherein the first axial ends of the rollers are aligned along a line parallel to the length direction of the roller transfer system.

6. A destacking conveyor as in claim 1 wherein the rollers have first and second axial ends and wherein the second axial ends of the rollers are aligned along a line oblique to the length direction of the roller transfer system and form a drop-off edge over which conveyed articles drop to the second conveyor.

7. A destacking conveyor as in claim 1 wherein the roller transfer system includes a linear-motor stator adjacent the plurality of rollers to produce a magnetic flux wave and wherein the rollers include electrically conductive or magnetic material forming a rotor rotated by the stator's magnetic flux wave.

8. A destacking conveyor as in claim 1 wherein one or more of the rollers is a motorized roller.

9. A destacking conveyor as in claim 1 wherein the first conveyor is an incline conveyor having an entrance end opposite the exit end and at an elevation lower than the first elevation.

* * * * *